E. M. SIMMONS.
CLIP-PLATES FOR BUGGY-SPRINGS.

No. 193,352. Patented July 24, 1877.

UNITED STATES PATENT OFFICE.

EDWARD M. SIMMONS, OF GRAND RAPIDS, MICHIGAN, ASSIGNOR OF ONE-HALF HIS RIGHT TO HARVEY D. BLAKESLEE, OF BUFFALO, N. Y.

IMPROVEMENT IN CLIP-PLATES FOR BUGGY-SPRINGS.

Specification forming part of Letters Patent No. 193,352, dated July 24, 1877; application filed June 22, 1877.

*To all whom it may concern:*

Be it known that I, EDWARD M. SIMMONS, of Grand Rapids, in the county of Kent and State of Michigan, have invented certain new and useful Improvements in Clip-Plates for Buggies, which improvements are fully set forth in the following specification, reference being had to the accompanying drawing.

My invention relates to that kind of clip-plates which are arranged upon the upper side of the buggy-spring, and provided with two recesses for holding the two clips which fasten the spring to the axle at the proper distance apart. Previous to my invention these recesses have been made straight, and the clips formed with a rectangular bend, which construction is objectionable, for the reason that the two legs of the clip are liable to be unequally strained by improperly tightening the nuts on the under side of the axle, and on account of the cost of the clips, which have to be forged with great care, or formed between suitable dies.

The object of my invention is the construction of a clip-plate which will permit of the use of clips having a half-round or oval bend; and it consists of a clip plate provided with two convex or arch-shaped bearing-surfaces for the clips, as will be hereinafter fully set forth.

Figure 1:
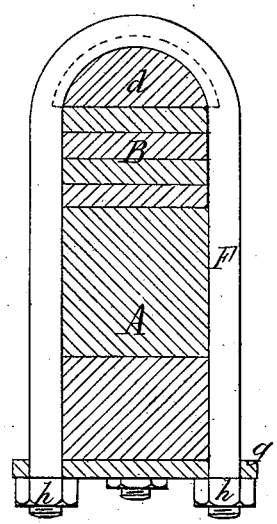
Figure 2:
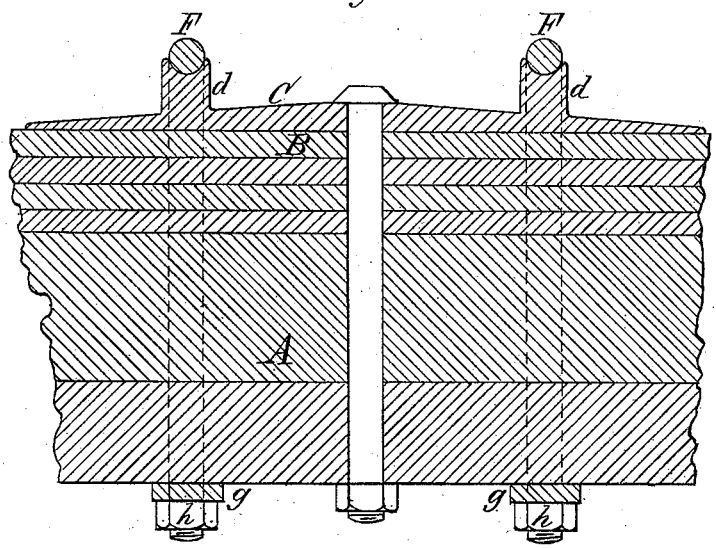
Figure 3:
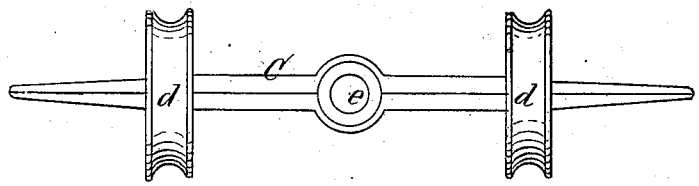
Figure 4:
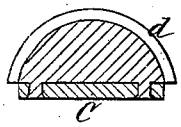

In the accompanying drawings, Figure 1 is an end view of my improved clip-plate and clip, with the axle and spring in section. Fig. 2 is a longitudinal section thereof. Fig. 3 is a plan view of the clip-plate. Fig. 4 is a cross-section of the clip-plate in a slightly-modified form.

Like letters of reference designate like parts in each of the figures.

A represents the axle of a buggy, and B the spring thereof. C represents the clip-plate, provided with two convex or arch-shaped bearings, $d$, preferably cast in one piece with the clip-plate, which latter is provided with a hole, $e$, for the passage of the center-bolt of the spring. F F are the clips, made of round iron, and formed with a semicircular or oval bend, so as to fit in the bearings $d$, which latter are provided with a semicircular groove, so as to hold the clips against lateral displacement. $g$ are the washer-plates or straps arranged with each clip on the under side of the axle, and $h$ the screw-nuts for tightening the clips. The clips F, having an oval or half-round bend, are readily bent cold, of round iron, at comparatively small expense. The convex bearings $d$ of the clip-plate C permit one clip-plate to be used with axles or springs of different widths, as a small bearing will receive and hold a larger clip, while with the straight bearing and rectangular clips, all of the parts must exactly conform to each other. In tightening the screw-nuts of a rectangular clip the strain of each nut is exerted only upon that part or leg of the clip on which the nut works, so that by unduly tightening one nut the other side of the clip may be raised from the bearing, while, with a convex bearing and half-round clip, the strain of the nuts is equally applied to the entire bearing-surface.

If desired, the bearings $d$ may be made separate from the clip-plate and secured thereto by riveting, as shown in Fig. 4; or the bearings may simply be provided with projections on their under side, to fit in recesses or holes in the clip-plate, with which they are held in contact by the clips; but I prefer to cast the bearings $d$ in one piece with the clip-plate C.

Having thus fully described my invention, what I claim as new, and desire to secure by Letters Patent, is—

A clip-plate for buggies, provided with convex or arch-shaped bearings $d$, adapting the clip-plate to be used with clips having a semicircular or oval bend, substantially as and for the purpose hereinbefore set forth.

EDWARD M. SIMMONS.

Witnesses:
ARTHUR WOOD,
JOHN R. SMITH.